United States Patent

[11] 3,628,758

| [72] | Inventor | Richard A. Nichols<br>Santa Monica, Calif. |
|---|---|---|
| [21] | Appl. No. | 843,667 |
| [22] | Filed | July 22, 1969 |
| [45] | Patented | Dec. 21, 1971 |
| [73] | Assignee | Parker-Hannifin Corporation<br>Cleveland, Ohio |

[54] FUEL TANK INERTING SYSTEM
7 Claims, 2 Drawing Figs.

[52] U.S. Cl. .................................................. 244/135,
55/199, 55/53
[51] Int. Cl. ................................................ B64d 37/18
[50] Field of Search........................................... 244/135;
137/434, 437, 592, 582, 571; 220/88; 55/82, 52,
53, 44, 199

[56] References Cited
UNITED STATES PATENTS

| 2,586,839 | 2/1952 | Mapes........................... | 220/88 |
|---|---|---|---|
| 2,711,842 | 6/1955 | Jonas............................ | 220/88 |
| 2,827,916 | 3/1958 | Manchester................... | 137/437 |
| 3,467,349 | 9/1969 | Gautier ........................ | 244/135 |
| 2,969,803 | 1/1961 | Mosher ........................ | 137/571 R |
| 3,229,446 | 1/1966 | Sebastian et al.............. | 55/53 |
| 3,468,103 | 9/1969 | Hergt............................ | 55/33 |

*Primary Examiner*—Milton Buchler
*Assistant Examiner*—Gregory W. O'Connor
*Attorney*—Oberlin, Maky, Donnelly & Renner

ABSTRACT: An inerting system to prevent fire and explosion within an aircraft fuel tank by maintaining in the vapor space thereof an oxygen concentration which is insufficient to support combustion. This low oxygen concentration (10 percent by volume or less) is accomplished by spraying or cascading fuel into the vapor space of the fuel tank during the fueling operation, said vapor space being filled with inert gas such as nitrogen thereby decreasing the oxygen content of the fuel. Thereafter, during flight, inert gas is employed to pressurize the fuel in the tank and to prevent entry of air into the tank when tank pressure decreases relative to ambient pressure as during descent of the aircraft.

INVENTOR.
RICHARD A. NICHOLS
BY
Oberlin, Maky, Donnelly & Renner
ATTORNEYS

FUEL TANK INERTING SYSTEM

BACKGROUND OF THE INVENTION

It is known that flame and explosion cannot propagate in fuel tank regardless of any ignition source or of any fuel vapor mixture provided that the oxygen concentration is below the flammability limit. Heretofore, it has been contemplated to employ an inert gas such as nitrogen to flush air (which is 21 percent oxygen) out of the tanks and then to pressurize the tank to prevent entrance of air into the tanks when the tank pressure tends to decrease relative to ambient pressure as during descent of the aircraft.

However, hydrocarbon fuels as employed in aircraft typically dissolve gases including oxygen from the air in proportion to the gas partial pressures at the air-fuel interface existing at the airports. Therefore, as tank pressure decreases during ascent, the fuel becomes supersaturated with the gases, that is, the fuel contains more gas than it can hold in equilibrium. When dissolved gases become supersaturated by reduction of pressure on the fuel, the gases will eventually come out of solution and rise into the vapor space above the liquid; however, they do have a tendency to remain in solution for extended periods of time depending on the degree of supersaturation and the degree of agitation of the liquid. Thus, the release of gases from fuel during and after climb is dependent on such variables as the attained altitude, buffeting of the aircraft by air turbulence, degree of fullness of the tank which affects the extend of sloshing, etc. Therefore, the timing of release of the gas in any particular flight is not predictable. Furthermore, the concentrations of the gases evolved from fuel by reduction of pressure is dependent on the partial pressures of the various dissolved gases and their solubility coefficients in the fuel. These factors are such that when gases are evolved from hydrocarbon fuel that has been supersaturated with air, the oxygen concentration in the vapor space may exceed 30 percent. Thus, simply preventing air from entering the fuel tank will not assure safety against fuel tank explosion. It is also necessary to deal with the gases dissolved in the fuel which will otherwise evolve therefrom as high oxygen concentration gases during and after ascent.

SUMMARY OF THE INVENTION

In the fuel tank inerting system constituting the present invention not only is an inert gas employed in the vapor space of the fuel tank to prevent air from entering and for diluting the oxygen which evolves from the fuel but additionally, dissolved oxygen is removed from the fuel during the tank fueling operation whereby oxygen concentration in the fuel tank vapor space is always maintained at a safe level of 10 percent or less oxygen concentration so as not to propagate flame or explosion.

Accordingly, it is a principal object of this invention to provide a fuel tank inerting system which entails the spraying or cascading of fuel into the vapor space of the tank during the fueling operation, the vapor space being filled with an inert gas such as nitrogen.

It is another object of this invention to provide a fuel tank inerting system characterized in that the fuel is introduced into the tank through a level control valve which has its outlet disposed in the vapor space of the tank and preferably near or even above the full level of the fuel in the tank.

It is another object of this invention to provide a fuel tank inerting system as aforesaid arranged so that a plurality of tanks may be filled from a single refueling port on one of the tanks, provision being made for transfer of the deoxygenated fuel from one tank to another.

It is another object of this invention to provide a fuel tank inerting system which is characterized in that the refueling port and a vent are so located with respect to each other that the inert gas in the vapor space being displaced as the fuel fills the tank sweeps the area whereat the fuel is sprayed or cascaded into the tank, thus to keep the partial pressure of the oxygen in the gas adjacent to the spray at a low level.

It is another object of this invention to provide a fuel tank inerting system which has the venting system as aforesaid arranged so that during the refueling operation an inert gas purge flow, such as nitrogen, can be added to the vapor space into which the fueling spray or cascade is entering, thus allowing the purge gas, released oxygen gas, and vapor space gas to vent overboard.

DISCUSSION OF THE INVENTION

Figure 1:
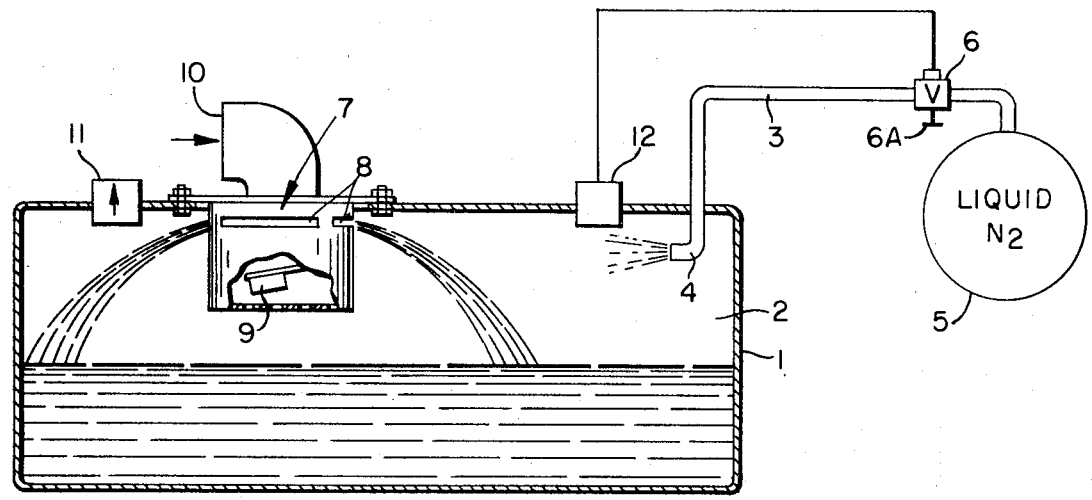
FIG. 1 is a diagrammatic view of a preferred embodiment of the present invention.

Referring now to FIG. 1, the reference numeral 1 denotes an aircraft fuel tank into the vapor space 2 of which is supplied an inert gas such as nitrogen through the conduit 3 and fog nozzle 4 leading to a dewar 5 containing the inert gas in liquid form. A suitable valve 6 is provided in conduit 3 to control the flow of the inert gas into the vapor space 2. Valve 6 may be opened manually by means of a handle 6A, or mechanically by means of a level sensing device when the aircraft is on the ground, or it may be opened by means of a differential pressure sensing device 12 when ambient pressure exceeds tank pressure by a predetermined amount, say 0.5 p.s.i., as when the aircraft is descending.

The fuel tank 1 has mounted thereon a level control valve 7 or the like which has fuel outlet ports 8 disposed in the vapor space 2, and preferably above the maximum fill level of the tank as controlled by a level sensing means such as the float 9 which is shown as a part of the level control valve and which is operative to close the inlet port 10 when a predetermined level of fuel is attained in the tank 1. The outlet ports 8 of the level control valve 7 are so arranged that the fuel is broken into droplets and flows into the vapor space 2 in generally conical spray or cascade form whereby the incoming fuel presents a very large surface area for effective removal of oxygen from the fuel in the presence of the inert gas filling the vapor space 2 in the tank 1.

Closely adjacent the level control valve 7 is a vent valve 11 for outflow of venting gases so that the inert gas present in the tank or added to the tank, which is being displaced as the fuel fills the tank 1, sweeps the fuel spray area so as to keep the oxygen partial pressure in the gas adjacent to the spray sufficiently low. The degree of atomization of the fuel created by the level control valve 7 must create sufficient interface area between the fuel droplets and the vapor space so that enough oxygen comes out of the droplets before they fall into the main body of fuel whereby the desired reduction of oxygen concentration in the fuel is achieved.

As known from Dalton's law of partial pressures, in a mixture of gases such as air, every gas appears to be a vacuum for every other gas. More completely stated, the total pressure exerted upon the walls of a container in which there is a mixture of gases is equal to the sum of the pressures produced by each constituent gas if each one occupied the container alone at the temperature of the mixture. In the present case, the fuel being supplied into the tank 1 through the level control valve 7 has some oxygen dissolved therein which tries to reach an equilibrium with the oxygen in the vapor space 2, but since the oxygen pressure in the vapor space 2 is zero or nearly so, the oxygen with say, a 3 p.s.i. partial pressure in the fuel, will leave the fuel at a rate which depends upon the area of the fuel-gas interface which herein is greatly increased by spraying or cascading the fuel into the inert gas atmosphere. In this way, as the fuel is sprayed into the nitrogen or other inert gas atmosphere, a large percentage of the oxygen in the fuel leaves the fuel and is diluted by the inert gas and carried out through the vent valve 11.

When the tank 1 is filled to the level determined by the level sensor 9, the fuel therein will have been deoxygenated to the extent that as oxygen remaining in the fuel comes out of the fuel and enters the vapor space in the tank as mentioned below the oxygen content of the vapor space will never exceed a safe level so that flame and explosion cannot be propagated.

During flight, as when the aircraft is climbing, the ambient pressure decreases and when the fuel tank pressure exceeds ambient pressure by more than say, 0.75 p.s.i. the vent valve 11 will open to vent the fuel tank until the pressure has dropped to within 0.75 p.s.i. of ambient at which time the vent valve 11 will close. At cruising altitude the vent valve 11 will remain closed and inert gas will be admitted through nozzle 40 to compensate for fuel use. As the tank pressure decreases during climbing, the amount of gas that the fuel will hold in saturated solution also decreases; however, the gas remains in supersaturated solution until it is caused to be released into the tank vapor space. If supersaturation is of sufficient magnitude, violent release can be effected by agitation as by buffeting of the aircraft in turbulent weather and create a dangerous condition. Because of the fueling method herein described, the oxygen concentration in the released gas as well as the quantity of released gas can be greatly reduced. By the design embodied herein, the released gas oxygen concentration can be controlled and predetermined. As the aircraft continues to climb, the vent valve 11 continues to drop the pressure of the fuel within the tank 1 and the release of nitrogen through said vent valve 11 will be repeated whenever the tank pressure drops an increment of say, 0.5 p.s.i.

As fuel is used during cruise at level altitude, or as ambient pressure rises during descent, the fuel tank pressure tends to become lower than ambient pressure whereby valve 6 is additionally opened to permit a relatively large flow of nitrogen to develop a pressure in the vapor space 2 sufficient to prevent vent valve 11 from opening. As a result air is not admitted into the tank during normal operation.

As evident from the foregoing, the vapor space 2 in the tank 1 is at all times maintained so as to have an oxygen concentration (10 percent or less) insufficient to support fire or explosion within the tank 1, this being accomplished by the combination of preventing air from entering the tank 1 and of removing dissolved oxygen from the fuel to prevent the oxygen concentration in the vapor space from exceeding a safe limit. Oxygen is removed from the fuel during the fueling operation by inducing diffusion across large gas fuel interface areas by reason of the spraying or cascading of the fuel into the tank 1 when refueling.

Figure 2:
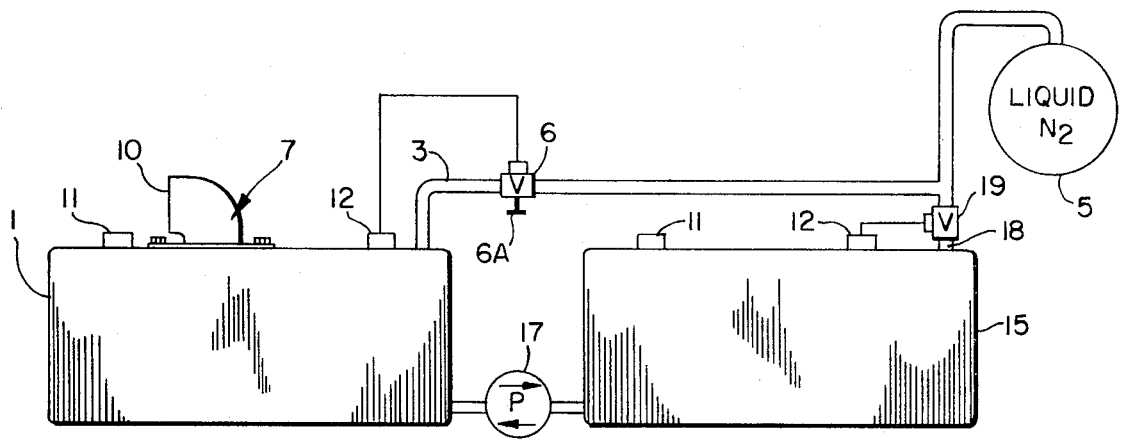
FIG. 2 is a diagrammatic view of another embodiment of the invention employing a plurality of tanks adapted to be filled from a single refueling port with provision for transfer of fuel from one tank to another.

Referring now to FIG. 2, the fuel tank 1, vent valve 11, level control valve 7, liquid nitrogen dewar 5, and valve 6 and differential pressure-sensing device 12 may be of the same construction as just described in connection with FIG. 1. For single-point fueling of another tank 15 from the inlet port 10 of the level control valve 7, a conduit 16 which may have a pump 17 therein transfers deoxygenated fuel from tank 1 to tank 15 during fueling or during flight and, of course, fuel in tank 15 may be retransferred to tank 1 if desired. Tank 15 will be provided with a vent valve 11 and an inert gas supply line 18 with a control valve 19 therein. The control valve 19 is controlled as by a differential pressure sensing device 12.

I, therefore, particularly point out and distinctly claim as my invention:

1. A fuel tank inerting system comprising a tank having a fueling port including spray means through which fuel is sprayed into the vapor space in said tank; and means for supplying an inert gas into said vapor space thus to deoxygenate the fuel and to dilute the oxygen content of the vapor space to an extent incapable of supporting combustion of fuel vapor in said vapor space; said spray means comprising a valve having an inlet port for receiving fuel from a fueling nozzle and circumferential outlets through which fuel is discharged into the vapor space in generally conical spray form.

2. The inerting system of claim 5 wherein said tank has vent means disposed adjacent an end of said tank and adjacent said spray means so that inert gas displaced from said tank during fueling sweeps through the fuel as it is sprayed into said vapor space to release oxygen from the fuel and to vent the oxygen diluted with inert gas through said vent means.

3. The inerting system of claim 2 wherein said tank has gas inlet means adjacent the other end thereof through which inert gas is added to the vapor space.

4. A fuel tank inerting system comprising a tank having a fueling port including spray means through which fuel is sprayed into the vapor space in said tank; and means for supplying an inert gas into said vapor space thus to deoxygenate the fuel and to dilute the oxygen content of the vapor space to an extent incapable of supporting combustion of fuel vapor in said vapor space; said spray means comprising a level control valve having level sensing means which is operative to close said valve upon filling of the tank to predetermined level.

5. A fuel tank inerting system comprising a tank having a fueling port including spray means through which fuel is sprayed into the vapor space in said tank; and means for supplying an inert gas into said vapor space thus to deoxygenate the fuel and to dilute the oxygen content of the vapor space to an extent incapable of supporting combustion of fuel vapor in said vapor space; said tank having vent means through which said inert gas and oxygen released from the fuel is exhausted during fueling and through which said inert gas is exhausted during flight of the aircraft when ambient pressure is decreasing relative to vapor space pressure; said spray means being disposed between said vent means and said means for supplying an inert gas into said vapor space so that inert gas displaced from said tank during fueling sweeps through the fuel as it is sprayed into said vapor space to release oxygen from the fuel and to vent the oxygen diluted with the inert gas through said vent means.

6. The inerting system of claim 5 wherein another tank has fluid communication with said tank whereby said another tank may be filled via said tank and the fueling port thereof; said another tank having means for supplying an inert gas into the vapor space thereof, and having vent means through which inert gas is exhausted from said another tank during flight of the aircraft when ambient pressure is decreasing relative to vapor space pressure in said another tank.

7. The inerting system of claim 6 wherein pump means between said tanks facilitates flow of fuel from said tank into said another tank and vice versa.

* * * * *